United States Patent [19]

Makabe et al.

[11] 4,271,773

[45] Jun. 9, 1981

[54] PULSE MOTOR ROTATION PHASE ADJUSTING SYSTEM OF A SEWING MACHINE

[75] Inventors: Hachiro Makabe, Fussa; Kazuo Watanabe, Hachioji; Toshiaki Kume, Tachikawa; Toshihide Kakinuma, Tokyo; Hideaki Takenoya, Hachioji, all of Japan

[73] Assignee: Janome Sewing Machine Co., Ltd., Tokyo, Japan

[21] Appl. No.: 18,674

[22] Filed: Mar. 8, 1979

[30] Foreign Application Priority Data

Mar. 11, 1978 [JP] Japan .................................. 53-27951

[51] Int. Cl.³ .............................................. D05B 3/02
[52] U.S. Cl. ................................................ 112/158 E
[58] Field of Search .......... 112/158 E, 121.11, 121.12, 112/275; 318/747, 748

[56] References Cited

U.S. PATENT DOCUMENTS

| 3,970,016 | 7/1976 | Yanikoski ........................ 112/121.12 |
| 4,006,391 | 2/1977 | Deering et al. ................... 318/747 X |
| 4,131,075 | 12/1978 | Wurst ............................. 112/158 E |

*Primary Examiner*—Peter P. Nerbun
*Attorney, Agent, or Firm*—Michael J. Striker

[57] ABSTRACT

A pulse motor rotation phase adjusting system for a sewing machine includes a pulse motor operative for positioning a needle of the sewing machine in accordance with the predetermined stitch coordinates of a selected pattern. The pulse motor is adapted to be set to one of the stepping rotation phases in dependence upon the predetermined combinations of the magnetic forces generated by the windings of the pulse motor. A light interrupting arrangement is provided in the system which is connected to the output shaft of the pulse motor and serves for detecting the respective rotation phases of the pulse motor within a range of the maximum needle swinging amplitude and to produce a signal corresponding to predetermined combination of the magnetic forces, which signal is read out by a control circuit operatively connected to the pulse motor to rotate and reset the same to its initial position in accordance with said predetermined stitch coordinates when the electric power is applied to the sewing machine.

3 Claims, 6 Drawing Figures

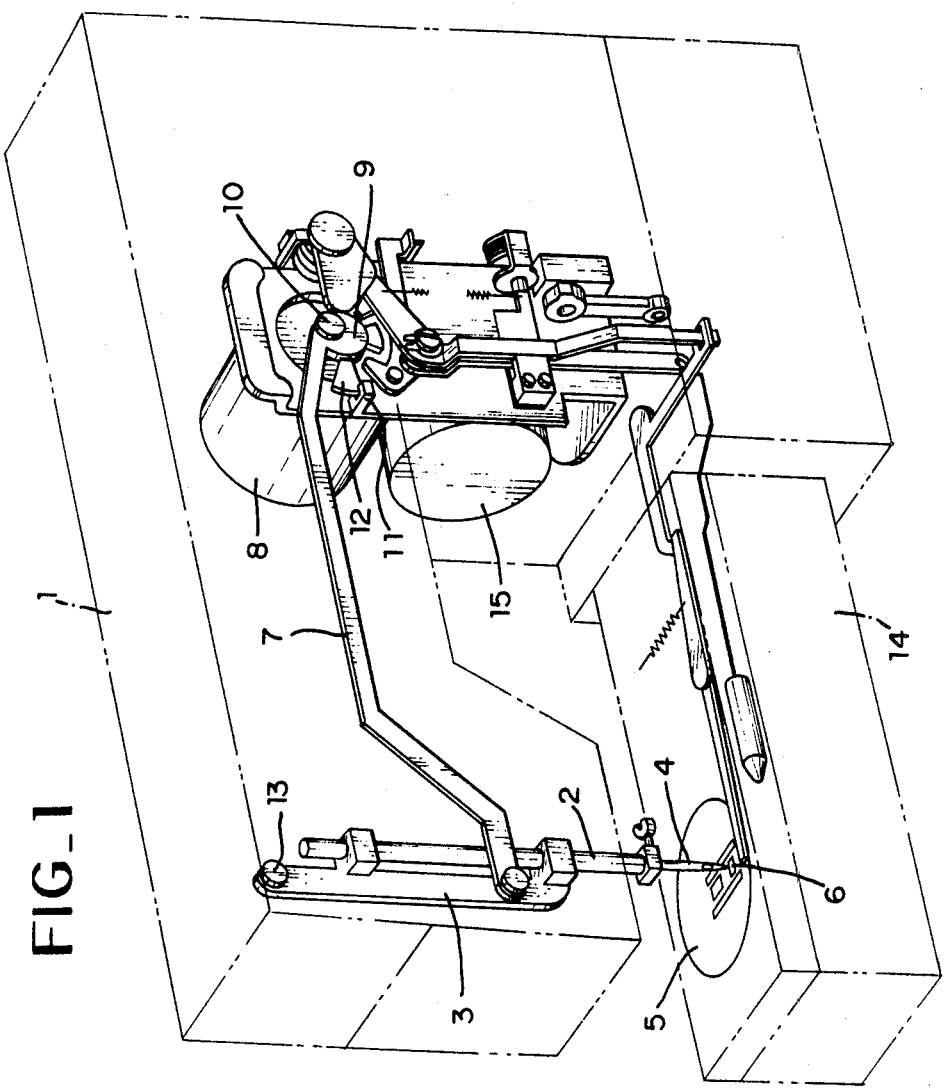
FIG_1

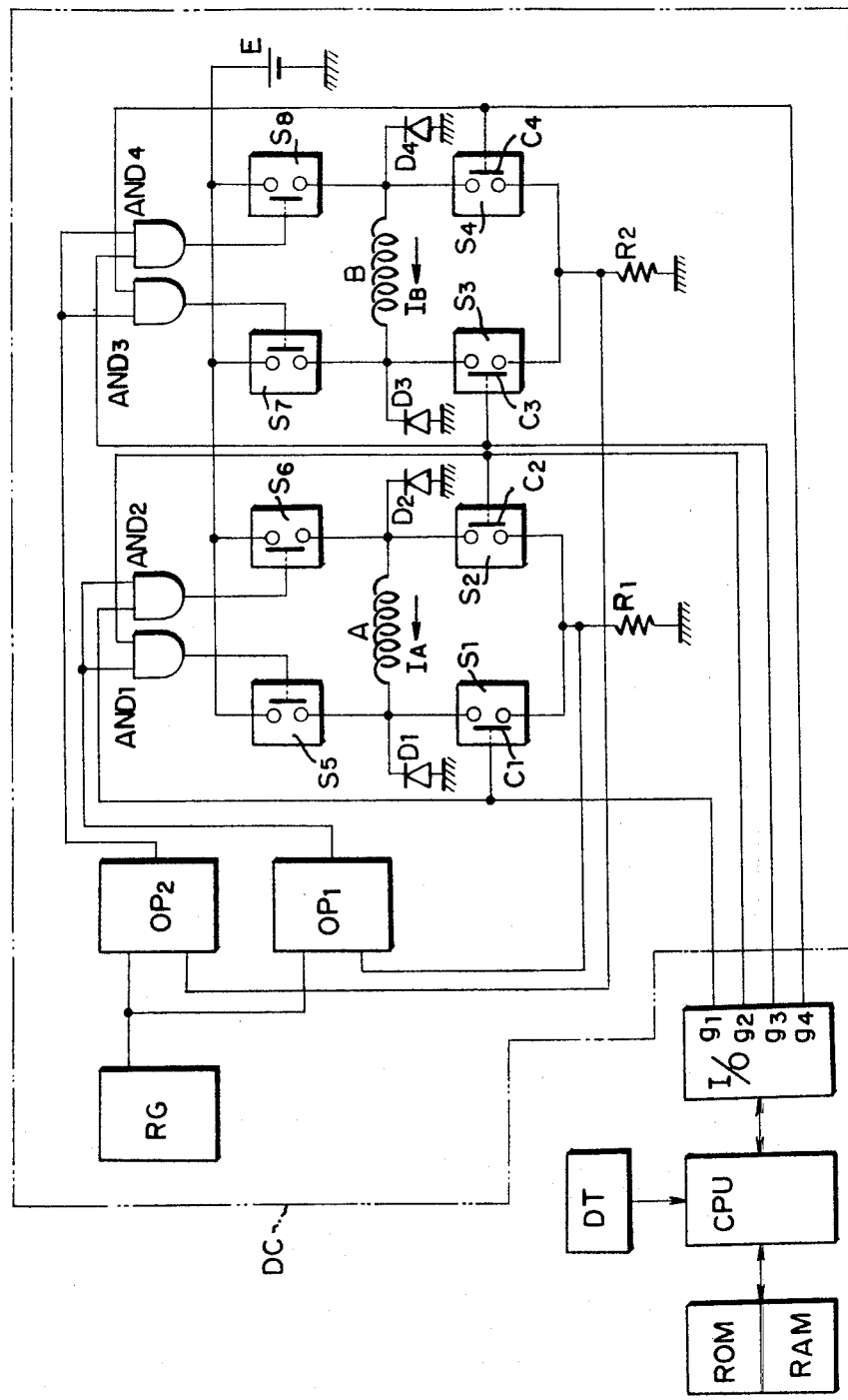
FIG_2

FIG_3

| Pattern coordinates | | x | y | z | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | U | V | W |
|---|---|---|---|---|---|---|---|---|---|---|---|---|---|---|---|---|---|---|---|---|---|---|---|---|---|---|---|---|---|---|---|---|---|---|---|---|---|---|
| Energized phases of pulse motor | A–Phase | | | | | | | | | | | | | | | | | | | | | | | | | | | | | | | | | | | | | | |
| | B–Phase | | | | | | | | | | | | | | | | | | | | | | | | | | | | | | | | | | | | | | |
| | Ā–Phase | | | | | | | | | | | | | | | | | | | | | | | | | | | | | | | | | | | | | | |
| | B̄–Phase | | | | | | | | | | | | | | | | | | | | | | | | | | | | | | | | | | | | | | |
| Detector Ex.1 | | ON | | | | | | | | | | | | | | | | OFF | | | | | | | | | | | | | | | | | | | | | |
| Detector Ex.2 | | ON | | | | | | | | | | | | | | | | | | | | | | | | | OFF | | | | | | | | | | | | |

L     M     R

FIG_4
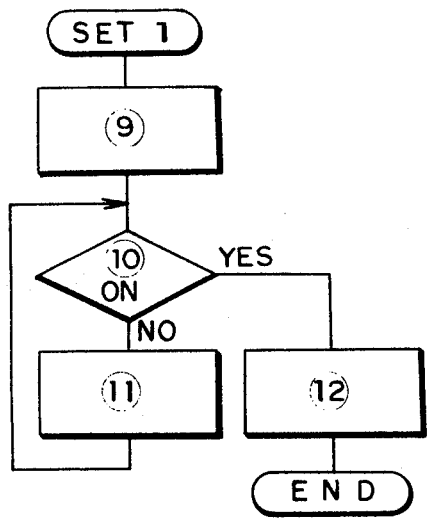
FIG_5
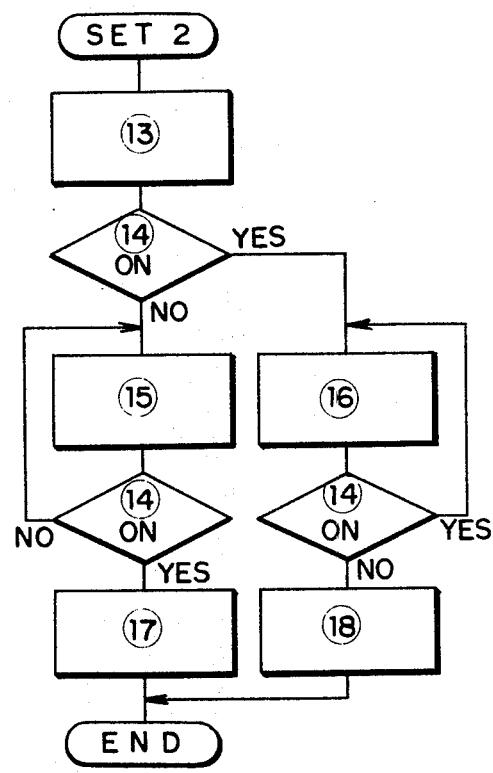
9   Positioning pulse motor by check phase
10  Detector
11  8-Pulse drive of pulse motor to L direction
12  One-pulse drive of pulse motor to R direction to coordinate 0
13  Positioning pulse motor by check phase
14  Detector
15  8-Pulse drive of pulse motor to L direction
16  8-Pulse drive of pulse motor to R direction
17  Setting pulse motor to coordinate 15
18  Setting pulse motor to coordinate 23

FIG_6
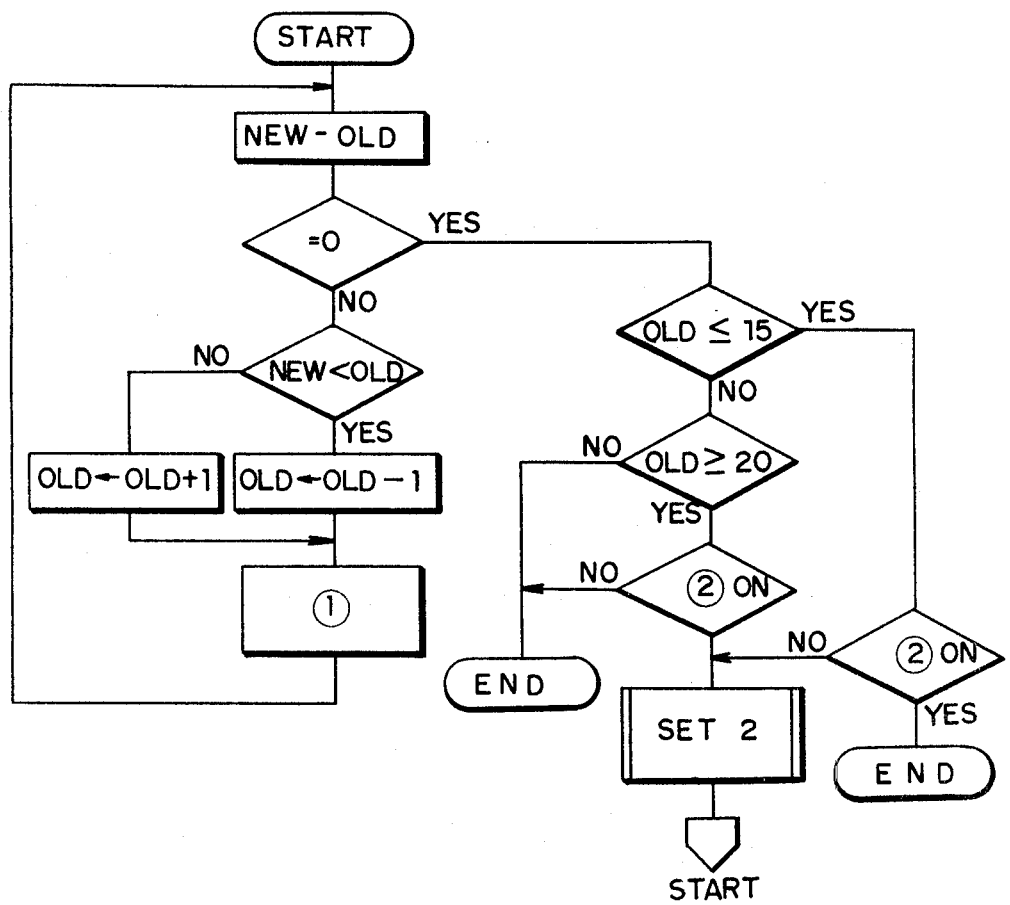
① One-pulse drive of pulse motor to L or R direction
② Detector

PULSE MOTOR ROTATION PHASE ADJUSTING SYSTEM OF A SEWING MACHINE

BACKGROUND OF THE INVENTION

The invention relates to a sewing machine and more particularly relates to a system for adjusting the rotation phase of a pulse motor of a sewing machine, which is used to control the movement of the pattern utilized to adjust instrumentalities of the sewing machine in response to the control signals from the control circuit.

A pulse motor used as a pattern generator receives a driving pulse from the control circuit and is periodically driven within a predetermined drive range to actuate the needle bar, the feed controlling device and others so as to produce stitch patterns.

However, there will be chances of erroneous operation of the pulse motor at the starting time, since a stopping phase of the pulse motor is not correctly set when the electric power is supplied. Further in case the pulse motor steps out of normal adjustment during its operation due to some events, it must be recovered to the normal operation so as to prevent the subsequent wrong operations thereof.

For preventing the above mentioned erroneous operation of the pulse motor, there have been the methods of detecting the stopping phase of the motor or of once resetting the motor to a predetermined phase at the time of the initial power supply. The former is sufficient to use the potentiometer but this is problematical in the durability and cost. The latter is to drive the pulse motor to one direction until it is stopped by a stopper. But this latter case has the problems of shock, sound and durability, and may cause the disordered stepping movement of the motor during the operation which cannot be corrected by the above-mentioned methods.

This invention has been devised to eliminate the above mentioned defects involved in the prior art.

SUMMARY OF THE INVENTION

It is a basic object of the invention to provide a pattern generating system simple in structure, reliable in operation and rapid in response.

These objects are achieved by a pulse motor rotation phase adjusting system including a pulse motor being set to one of the stepping rotation phases. The pulse motor has two windings, each energized to produce magnetic forces in the opposite directions. The pulse motor is adjusted in dependence upon one or predetermined combinations of the magnetic forces of the windings. The system is also provided with a phase detector for detecting the respective rotation phases of the pulse motor in ON and OFF ranges and connected to a control circuit which produces the predetermined combinations of the magnetic forces of the windings so as to cause a rotation of the pulse motor in accordance to the corresponding rotation phases detected by the phase detector in the ON and OFF ranges.

Many other features and advantages of the invention will be apparent from the following explanation of embodiments of the invention.

BRIEF DESCRIPTION OF THE DRAWINGS

FIG. 1 is an outlined view of a sewing machine provided with a system of the invention, FIG. 2 is a block circuit diagram for controlling the pulse motor, FIG. 3 is a table showing the relations between the stitch coordinates and the phase energizations of the pulse motor, FIG. 4 is a flow chart for controlling the operation of the pulse motor, FIG. 5 is another embodiment of flow chart for controlling the operation of the pulse motor, and FIG. 6 is still another embodiment of flow chart for preventing the wrong operation of the pulse motor.

DETAILED DESCRIPTION OF THE INVENTION

FIG. 1 shows a sewing machine of the invention represented only with the necessary elements for the convenience of explanation of the invention. The reference numeral (1) is a machine housing incorporating therein a needle bar (2) with a needle (4), which is supported by a needle bar support (3) for vertical receiprocation. The needle bar support (3) is swingable on a pivot (13). The reference number (5) is a needle plate mounted on a lower machine bed (14) and is formed with a hole, into which the needle drops. A rod (7) is connected between the needle bar support (3) and a pulse motor (8) so as to transmit the control operation of the motor to the bar support. The pulse motor (8) has a crank (9) connected to output shaft thereof. The transmission rod (7) is at one end thereof connected to the crank (9) at a point (10) radially spaced from the center axis of the output shaft of the pulse motor (8), so that the turning movement of the output shaft of the pulse motor may swing the needle (4) laterally of the feeding direction. The reference numerals (11) indicating a U-shaped element and (12) indicating a sector plate denote a photo-interpreter unit. The U-shape element (11) secured to the machine housing carries a light emitting diode and a phototransistor in an opposite and spaced relation (not shown). The sector plate (12) is connected to the output shaft of the pulse motor (8), so that the sector plate may be turningly moved as the output shaft of the pulse motor (8) makes a turning movement. When the sector plate (12) is positioned in alignment with the U-shaped element (11), it interrupts the light from the light emitting diode to the phototransistor. The pulse motor (8) makes a turning movement when it receives a pulse from a control circuit provided in the machine housing and shown in FIG. 2. In the embodiment shown in FIG. 1, another pulse motor (15) is illustrated for controlling the feeding amount and direction of the feed dog. Since the two pulse motors are driven in the same manner, explanation will be made only regarding the pulse motor controlling the lateral swinging movment of the needle.

FIG. 2 shows a block circuit for controlling the pulse motor, in which DC is a pulse motor drive circuit including pulse motor windings (A) and (B) arranged with an angular phase of 90° to each other. Switches $(S_1)-(S_8)$ are operated to close or open in combinations so as to cut or allow the flow of electric current $(I_A)$, $(I_B)$ to the windings (A), (B) or to change the direction of the current flow. For the convenience sake, it is to be called here A-phase energization when the current $(I_A)$ flows in the direction as shown by an arrow mark, and $\bar{A}$-phase energization when the current $(I_A)$ flows in the opposite direction. Similarly B-phase energization or $\bar{B}$-phase energization is named in dependence upon the flowing direction of the current $(I_B)$. (E) is a DC power source for energizing the windings, and $(R_1)$ and $(R_2)$ are current checking resistors for the windings. During the closed period of the switches ($S_1$)–($S_4$), the switches ($S_5$)–($S_8$) are rapidly closed and opened for chopping control the current to the windings (A), (B). Diodes ($D_1$)–($D_4$) constitute the circuits for the windings (A), (B) discharging the stored electromagnetic energy during the opened period of the switches ($S_5$)–($S_8$), to thereby stabilize the current of the windings. (I/O) is an input and output part of a microcomputer, which has the output terminals ($g_1$)–($g_4$) producing the binary 4-bit signals to drive the pulse motor.

These output terminals ($g_1$)–($g_4$) are connected to the contact elements ($C_1$)–($C_4$) of the switches ($S_1$)–($S_4$), respectively. Each output terminal is connected to one of the input terminals of the AND circuits designated as ($AND_1$)–($AND_4$). If the AND circuits receive a signal of logic value 1, the corresponding switches ($S_1$)–($S_4$) are closed, and at the same time the other input terminals of the AND circuits are made effective. (RG) is a device for producing a triangular wave signal of a constant height having a chopping frequency. ($OP_1$) and ($OP_2$) are chopping signal generating devices, each arranged in match with the windings (A), (B), respectively. These chopping signal generating devices receive the triangular wave as a reference voltage from the triangular wave signal generator (RG), and compare the voltages from the current checking resistors ($R_1$), ($R_2$) with the reference voltage respectively so as to determine the pulse width implying the logic 1 of each triangular wave, which is applied to the other input terminal of the AND circuits ($AND_1$)–($AND_4$), thereby to make a chopping control of the current to the windings (A),(B). (ROM) is a read write memory for storing signals to control the operation of the switches ($S_1$)–($S_8$) and the program control signals. (CPU) is a central process unit for controlling the programming processes. (RAM) is a read-write memory for temporarily memorizing the programming processes and the results.

(ROM), (RAM), (CPU) and (I/O) constitute a microcomputer.

(DT) is the photo-interrupter unit comprising the aforementioned elements (11, 12) shown in FIG. 1.

FIG. 3 shows a relation between the pattern coordinates of the sewing machine and the energization phases of the pulse motor. The pattern coordinates shown as 0–30 have been provided by equally dividing the maximum lateral swinging amplitude of the needle into 31 points. L, M and R indicate the stitch coordinates O, 15 and 30, respectively. The stitch coordinate 0 is the left side and point of the maximum lateral swinging amplitude of the needle for making an actual stitch. The stitch coordinate 15 is the center point of the maximum needle swinging amplitude. The stitch coordinate 30 is the right side end point of the maximum needle swinging amplitude. Each step between the stitch coordinates 0–30 corresponds to one stepping motion of the pulse motor. Letters x, y, z, u, v and w show the points, in addition to the stitch coordinates 0–30, provided therebetween, corresponding to the steps (or spaces) equal to those between the stitch coordinates on both outside ranges of the laterally extended needle hole (6) shown in FIG. 1. Of these additional divided coordinates, z and u are the coordinates to which the needle is permitted to swing beyond the stitching range 0–30, though the stitches are not actually made. The phase energizations, namely A-$\overline{B}$ phase energizations of the pulse motor are each shown by many straight lines. If any of the stitch coordinates 0–30 are within a single phase energization these coordinates can be obtained by such a single phase energization. If any of the stitch coordinates 0–30 are within a plurality of phase energizations, these coordinates can be obtained by such a plurality of phase energizations. In other words, if the A-phase and the $\overline{B}$-phase are simultaneously energized, the needle position is controlled by any of the coordinates z, 7, 15, 23 and u. But such a number of coordinates to be obtained is determined by the total number of divided coordinates and by the total number of phases to be energized of the pulse motor.

According to the invention, the needle position coordinates designated by the straight lines in FIG. 3 are selectively or collectively controlled by a pulse motor phase detector which is the aforementioned photo-interrupter unit (11, 12) shown in FIG. 1. The phase detection of the pulse motor by the phase detector of Example 1 can be obtained by the sector angle of the light interrupting plate (12) and the angle with which the light interrupting plate is mounted to the output shaft of the pulse motor. The phase detector of Example 1 has an indefinite range filled with the oblique lines, an OFF range where the sector plate (12) interrupts the light of the photo-transistor, and an ON range where the sector plate (12) does not interrupt the light of the photo-transistor. In order to reset the pulse motor to the initial position when the power source of the control circuit shown in FIG. 2 is thrown, the light interrupting sector plate (12) is secured to the output shaft of the pulse motor in such an angular position as to make the detector ON when the needle has come to the coordinate (Z) as shown in FIG. 3. Therefore with the A and $\overline{B}$ phase energizations, which are to be called collectively a check phase hereinafter, only the coordinate (Z) is in the ON range of the detector whereas the other coordinates are all in the OFF range of the detector, and therefore the coordinate (Z) is determined as a reset position of the pulse motor. Namely at the time of the initial drive of the pulse motor when the power source (E) of the control circuit (see FIG. 2) has been thrown, the switches ($S_1$), ($S_6$), ($S_4$) and ($S_7$) are closed and the check phase energization is provided by the control operation of the microcomputer including the central process unit (CPU). Then if the phase detector of Example 1 shows OFF range, the control circuit operates the pulse motor (8) from the right to the left direction in FIG. 3 until the detector shows the ON phase.

FIG. 4 shows a flow chart for controlling the needle (4) to the reset position when means of the phase control circuit is thrown. A control start signal is applied to the SET1, the check phase energization is provided, and then the pulse motor (8) is positioned to one of the coordinates (Z), (7), (15), (23) and (u) shown in FIG. 3. Then the signal of phase detector is checked whether it is ON or OFF. If it is OFF, 8 number of pulses are generated to displace the needle (4) towards the leftward direction in FIG. 3. If the ON signal of the detector is still obtained, further 8 pulses are generated until the ON signal is obtained. If the ON signal has been obtained, it implies that the needle (4) has come to the coordinate (Z). Then one pulse is generated to displace the needle one step to the right so as to position the needle to the coordinate (0) which is the reset position of the needle. Thus a series of programs are completed.

As shown in FIG. 3, the phase detector of Example 2 provides an ON - OFF changeover range near the central coordinate of the maximum lateral swinging amplitude of the needle. The explanation will be made with reference to FIG. 3 and FIG. 5 which shows a flow chart of this embodiment. If a control start signal is applied to the SET2, the pulse motor (8) is positioned to one of the coordinates identified by the circle marks. Then if the signal of the detector is OFF, 8 number of pulses are generated to turn the pulse motor so as to displace the needle (4) until the needle comes to the coordinate (15). If the signal of the detector becomes ON, it implies that the needle has come to the coordinate (15). If the signal of the detector of Example 2 is ON when it has been initially positioned, the pulse motor is turned 8 steps (or with additional 8 steps) toward the right direction in FIG. 3 until the needle comes to the coordinate (23). The coordinates 0, 15 or 23 define the initial reset position of the needle (4) in this case. Therefore the central process unit (CPU) reads out the reset position to generate drive pulses to the pulse motor for actual stitching operation. Generally the patterns stitched by the sewing machine are formed by the seams more frequently extending across the central part (M) of the needle hole (6). Therefore by using the phase detector of Example 2, the turning operation of the pulse motor (8) is checked if it is normally operated or not, each time it turns across the central part of the stich coordinates. Therefore the pulse motor (8) is prevented from stepping out of a predetermined adjustment, if any, each time it turns across the central part of the stitch coordinates during the actual stitching operation.

FIG. 6 shows a flow chart for recovering the operation of the pulse motor, if it is wrong, to the normal operation by means of the phase detector of Example 2. If the program is started at START, a difference is calculated between a new coordinate control data (NEW) and the existing coordinate control data (OLD). If the difference is not 0, it is detected if the pulse motor should be turned in the forward or the rearward direction in the direction L or R by one-step pulses until the difference becomes 0 which is to be registered as an existing position coordinate (OLD). If the existing position coordinate is determined, the data (OLD) is discriminated if it is less than the coordinate (15) in FIG. 3 or not. If it is less, the detector of Example 2 is checked if it is ON or OFF. If it is ON, it means that the pulse motor is normally operated, and a series of programs is terminated. If it is OFF, it means that the pulse motor is stepping out of the normal operation. In this case, the pulse motor is set to the initial position by the programs as shown in FIG. 5 so as to be readjusted to the required coordinate. If the existing data (OLD) is more than the coordinate (15), especially if it is more than the coordinate (20), the detector of Example 2 is checked if it is ON or OFF. If it is OFF, the pulse motor is normally operated, and a series of programs are terminated. If it is ON, it means that the pulse motor is stepping out of the normal adjustment. In this case, the pulse motor is set to the initial position by the programs as shown in FIG. 5 and is readjusted to the required coordinate. If the existing data (OLD) is more than the coordinate (15) and less than the coordinate (20), the existing data (OLD) corresponds to the range filled with the oblique lines in FIG. 3 which is the indefinite range, and a series of programs is terminated without checking of the pulse motor whether it is normally operated or not.

In case a twin-needle is employed, the maximum lateral swinging amplitude of the needle must be reduced to about a half. This may be obtained by determining the ON range of the detector as the range in which the maximum swinging amplitude of the needle is limited.

we claim:

1. A pulse motor rotation phase adjusting system for a sewing machine, comprising a pulse motor adapted for positioning a needle of the sewing machine in accordance with the predetermined stitch coordinates of a selected pattern, said pulse motor having at least two windings each being energized to produce magnetic forces in the opposite directions, the pulse motor being set to one of the stepping rotation phases in dependence upon one or more predetermined combination of the magnetic forces of the windings; phase detector means operatively connected to said pulse motor for detecting the respective rotation phases of the pulse motor wihtin a range corresponding to the maximum needle swinging amplitude to produce a signal corresponding to said one or more predetermined combinations of the magnetic forces; and control means operative to selectively rotate the pulse motor in two opposite directions in response to said signal and reset the pulse motor to its initial position to thereby positon the needle in accordance with said predetermined stitch coordinates at the time when electric power is applied to the sewing machine.

2. The system of claim 1, wherein said phase detector means include an element secured to the housing of the sewing machine and carrying a light emitting diode and a photo-transistor spaced therefrom, and a sector plate operatively connected to said pulse motor and adapted to interrupt the light between said diode and said photo-transistor as the pulse motor rotates.

3. The system of claim 2, wherein said pulse motor is initially set to a central point of said stitch coordinates corresponding to the center of said maximum needle swinging amplitude and said control means are adapted to check the erroneous operation of said pulse motor and rotate the same into its initial position in response to a signal produced by said phase detector means, said signal corresponding to the compared result between the respective signals of the next stitch and of the initial reset position of said pulse motor.

* * * * *